US006686881B1

(12) United States Patent
Lu et al.

(10) Patent No.: US 6,686,881 B1
(45) Date of Patent: Feb. 3, 2004

(54) WIRELESS IDENTIFICATION AND TRACKING USING MAGNETIC FIELDS

(75) Inventors: David Jun Lu, San Jose, CA (US); Thomas Guthrie Zimmerman, Cupertino, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/451,474

(22) Filed: Nov. 30, 1999

(51) Int. Cl.[7] .......................... G01S 3/02; G01S 13/08; G08B 29/00
(52) U.S. Cl. .................. 342/458; 342/47; 340/511; 340/572.4; 340/686.6
(58) Field of Search .................. 342/458, 125, 342/51, 126, 464, 47; 340/870.32, 505, 539, 551, 825.72, 511, 572.2, 572.4, 572.6, 686.6, 870.16; 324/207.26, 260, 207.11, 207.22

(56) References Cited

U.S. PATENT DOCUMENTS

| 3,040,315 A | * | 6/1962 | Kramer ....................... 342/385 |
| 3,134,104 A | * | 5/1964 | Murphree et al. ........... 342/458 |
| 3,750,167 A | | 7/1973 | Gehman et al. |
| 4,812,852 A | | 3/1989 | Bent et al. |
| 4,908,629 A | | 3/1990 | Apsell et al. |
| 5,021,794 A | | 6/1991 | Lawrence |
| 5,126,746 A | * | 6/1992 | Gritton ......................... 342/125 |
| 5,138,322 A | * | 8/1992 | Nuttall ......................... 342/126 |
| 5,218,344 A | | 6/1993 | Ricketts |
| 5,363,425 A | | 11/1994 | Mufti et al. |
| 5,477,210 A | * | 12/1995 | Belcher ..................... 340/686.6 |
| 5,485,154 A | * | 1/1996 | Brooks et al. ................ 342/44 |
| 5,621,388 A | | 4/1997 | Sherburne et al. |
| 5,732,401 A | | 3/1998 | Conway |
| 6,140,964 A | * | 10/2000 | Sugiura et al. ............. 342/464 |
| 6,392,547 B1 | * | 5/2002 | Stewart et al. ........... 340/573.1 |

* cited by examiner

Primary Examiner—Gregory C. Issing
(74) Attorney, Agent, or Firm—Gates & Cooper LLP

(57) ABSTRACT

A method, apparatus, article of manufacture, and a memory structure for tracking assets. The method comprises the steps of generating a magnetic field at the base station, receiving a radio signal transmitted from the remote station disposed at a location, and determining a distance from the base station to the location from the received radio signal transmitted from the remote station. In another embodiment of the invention, the method comprises the steps of remotely sensing a magnetic field generated by a base station, measuring an intensity of the sensed magnetic field, and transmitting a radio signal from the remote station to the base station as an indication of a distance between the base station and the remote station. The apparatus comprises tracking system having a magnetic field generator, a receiver for receiving a signal from a remote station indicative of a distance between the base station and the remote station, and a processor, coupled to the magnetic field generator and the receiver, the processor for determining a distance from the remote location to the base station from the received signal. In one embodiment, the processor is embodied in discrete components, which generate a signal proportional to the distance between the remote location and the base station. In another embodiment, the processor includes a digital processing unit communicatively coupled to a memory having instructions for computing the distance between the remote location and the base station from the received signal.

11 Claims, 7 Drawing Sheets

WIRELESS IDENTIFICATION AND TRACKING USING MAGNETIC FIELDS

BACKGROUND OF THE INVENTION

1. Field of the Invention

The present invention relates to systems and methods of tracking remote stations, and in particular to a method and system for tracking a remote station.

2. Description of the Related Art

The tracking of enterprise assets is a common problem for many businesses. Such enterprise assets include for example, stationary assets such as product inventory, business files and computers, and mobile assets such as fork lifts, test equipment, etc. The problems encountered in keeping track of enterprise assets increase dramatically as the number of assets increase.

Optical bar code devices offer one solution to the asset-tracking problem. With these systems, a bar code is placed on a visible surface of the asset. When a user moves the asset, a bar code reader is used to "check out" the asset, and indicate that possession (and presumably responsibility for the asset) has been reassigned from its present custodian (which may be file room, equipment room, or inventory storage facility) to a new custodian. Thereafter, the new custodian can transfer possession and responsibility to yet another custodian by again scanning the barcode on the asset with another bar code reader. Using this method, the custodian of the package can be determined at any arbitrary time, and the location of the package can be thus determined. The problem with such systems is that many users fail to scan the barcode before taking possession for the asset. When this occurs, the custodian (and hence, the location) of the asset will be unknown to the system.

Other devices for determining the location of an asset are known in the art. For example U.S. Pat. No. 5,218,344 teaches determination of the position of an asset from the time of arrival of a radio frequency (RF) signal. Unfortunately, this solution is unsuitable for low-value assets disposed over relatively short distances. Because the propagation speed of the RF signal is the speed of light (about 30 centimeters per nanosecond), high precision electronics are required to determine ranging over short (20 meters or so) distances.

Similarly, U.S. Pat. No. 5,621,338 teaches the detection of pre-selected distances using an in-range/out-of-range determination. While useful to bound a tracked object within certain boundaries, it does not provide an indication of the precise location of the asset.

U.S. Pat. No. 5,021,794 teaches the use of an ultra high frequency (UHF) radio direction finding and distance measurement which uses the RF signal strength for ranging. However, radio waves in the UHF band can be widely scattered by common environmental materials, resulting in unreliable ranging estimates over short distances.

As can be seen from the foregoing, there is a need for a system for tracking assets that does not rely on any overt actions on the part of current or potential custodians, and yet provide a low cost, high accuracy tracking of the asset at relatively short distances. The present invention satisfies that need.

SUMMARY OF THE INVENTION

To address the requirements described above, the present invention discloses a method and apparatus for tracking assets from a base station.

The method comprises the steps of generating a magnetic field at the base station, receiving a radio signal transmitted from the remote station disposed at a location, and determining a distance from the base station to the location from the received radio signal transmitted from the remote station. In another embodiment of the invention, the method comprises the steps of remotely sensing a magnetic field generated by a base station, measuring an intensity of the sensed magnetic field, and transmitting a radio signal from the remote station to the base station as an indication of a distance between the base station and the remote station.

The apparatus comprises a magnetic field generator, a receiver for receiving a signal from a remote station indicative of a distance between the base station and the remote station, and a processor, coupled to the magnetic field generator and the receiver, the processor for determining a distance from the remote location to the base station from the received signal. In one embodiment, the processor is embodied in discrete components that generate a signal proportional to the distance between the remote location and the base station. In another embodiment, the processor includes a digital processing unit communicatively coupled to a memory having instructions for computing the distance between the remote location and the base station from the received signal.

The present invention achieves the goal of asset location and management without requiring an active intervention by the custodian or expensive electronics. In one embodiment, the base station emits an undulating magnetic field. A remote station is placed on or near the asset to be tracked. In one embodiment, the remote station is embodied in a card having a magnetic field sensor that transmits a radio frequency identification (RF) signal when the measured magnetic field exceeds a detection threshold. Since the detection threshold and field strength of the magnetic field at the base station is known or can be determined, the distance between the base station and the card is computed from the time that the RF signal is received from the card. The RF signal identifies the card to the base station at the time of field detection and hence the distance is proportional to the square root of the magnetic field strength at the time of detection.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
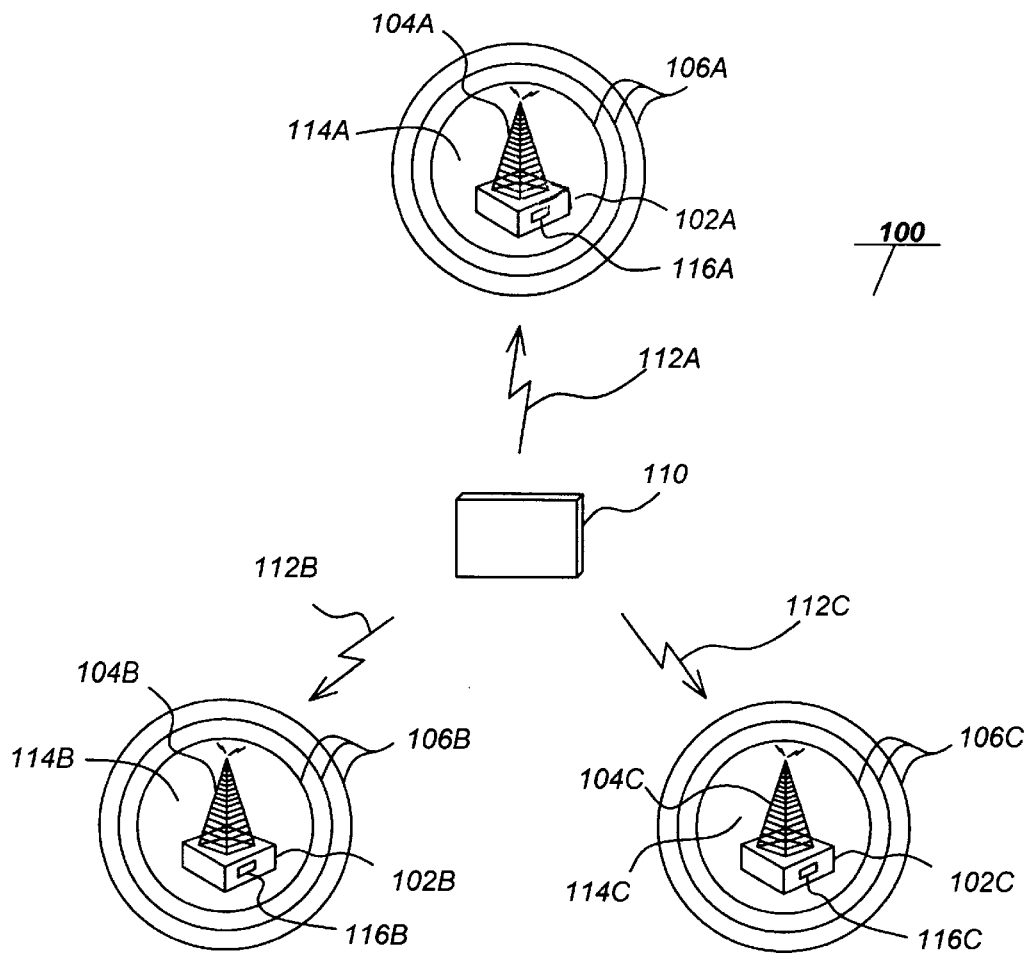
FIG. 1A is a system diagram showing the operational principles of the tracking system.

FIG. 1A is a system diagram showing the general operational principles of the tracking system 100. The tracking system 100 comprises one or more base stations 114A–114C (hereinafter collectively referred to as base station 114). Each base station 114 comprises magnetic field generator 116A–116C (hereinafter collectively referred to as magnetic field generator 116) coupled to an electromagnetic wave propagation device such as base station antenna 104A–104C (hereinafter collectively referred to as base station antenna 104). The magnetic field generator 116 and base station antenna 104 generate a magnetic field H. In one embodiment, the intensity of the magnetic field varies with time [H(t)], as indicated by magnetic field lines 106A–106C.

The tracking system 100 also comprises a remote station or card 110 which senses and measures the intensity of the magnetic field from the base station(s) 114, and transmit a signal as an indication of the distance between the base station 114 and the card 110 to the base stations 114A–114C via links 112A–112C.

In one embodiment of the present invention, the card 110 determines if the intensity of the magnetic field from the base station 114 exceeds a threshold value. If so, the card 110 transmits a radio frequency (RF) signal to the base station 114. The radio signal includes information identifying the card 110. Since the strength or intensity of the magnetic field at the base station 114 is known (it can be measured or accurately predicted, since the base station 114 itself generates the magnetic field) and the threshold value for the card 110 is known (it can be pre-assigned, or transmitted with the RF signal), the distance from the base station 114 to the card 110 can be determined.

Among other things, the intensity of a magnetic field depends on the distance from the source of the magnetic field and the antenna used to generate the magnetic field. A derivation of the magnetic filed strength for different antennae is disclosed in the MICROID 13.56 MHz RFID System Design Guide, published July 1999 by MICROCHIP TECHNOLOGY INC., which is hereby incorporated by reference herein.

Figure 1B:
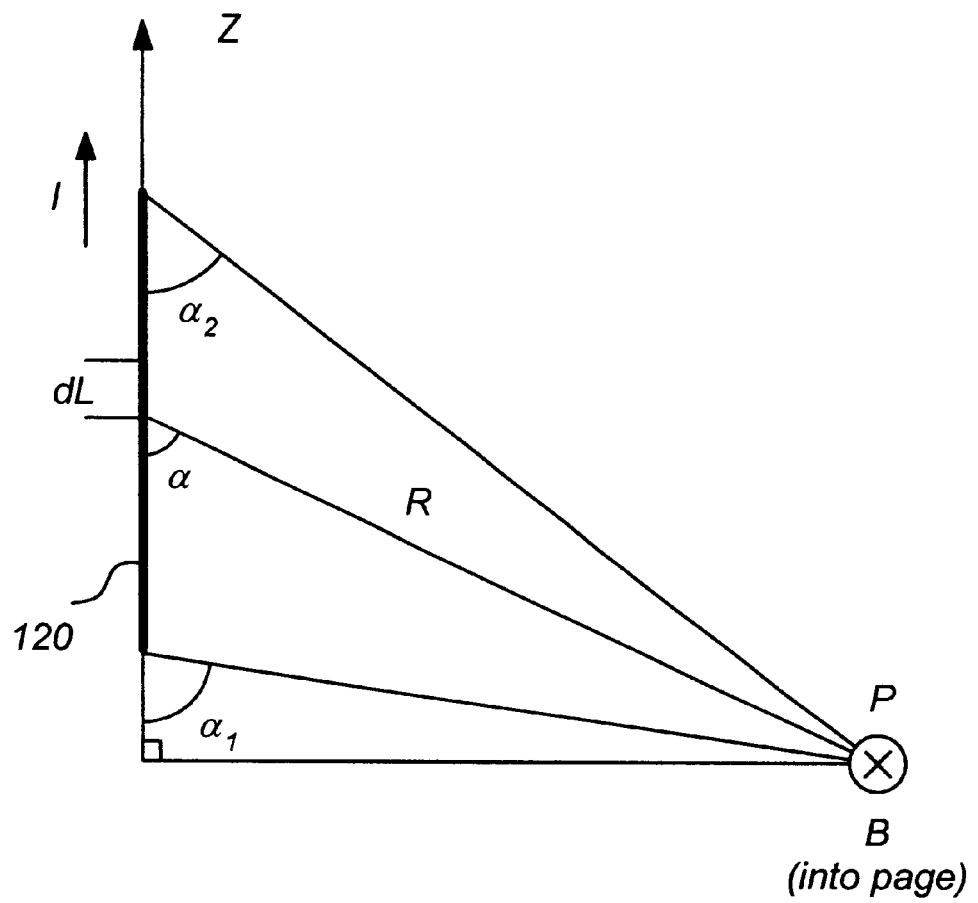
FIGS. 1B and 1C are diagrams illustrating geometrical relationships useful in deriving the strength of the magnetic field.

For example, the magnetic flux density produced by a current element, as shown in FIG. 1B on a round conductor such as a wire 120 with a finite length is given by equation (1) below:

$$B_\phi = \frac{\mu I}{4\pi r}(\cos\alpha_2 - \cos\alpha_1) \quad (1)$$

wherein $B_\phi$ is the flux density of the magnetic field, I is the current, r is the distance from the center of the wire, and $\mu$ is the permeability of the transmission medium, and the angles $\alpha_1$ and $\alpha_2$ are as shown in FIG. 1B. In the special case where the wire is infinitely long, $\alpha_1=180°$ and $\alpha_2=0°$, and equation (1) can be rewritten as $$B_\phi = \frac{\mu I}{2\pi r} \quad (2)$$

The magnetic field intensity H varies according to an inverse relationship with the distance from the magnetic field source as follows:

$$H = \frac{B_\phi}{\mu} = \frac{I}{2\pi r} \quad (3)$$

Therefore, for the foregoing case (a magnetic field created by current I passing through an infinitely long wire, the magnetic field strength can be determined as a function of a distance r as follows by combining equations (1)–(3):

$$r = \frac{I}{2\pi H} \quad (4)$$

In this case, once the magnetic field strength has been determined, the distance between the base station 114 and the card 110 can be determined from the following relation:

$$r \propto \frac{H_T(t_{thresh})}{H_{R_{thresh}}} \quad (5)$$

where $H_T(t_{thresh})$ is the measured or estimated magnitude of the magnetic field at the base station at the time the magnetic field at the card 110 exceeds the threshold value (hereinafter $t_{thresh}$) and $H_{R_{thresh}}$ is the magnetic field threshold.

Figure 1C:
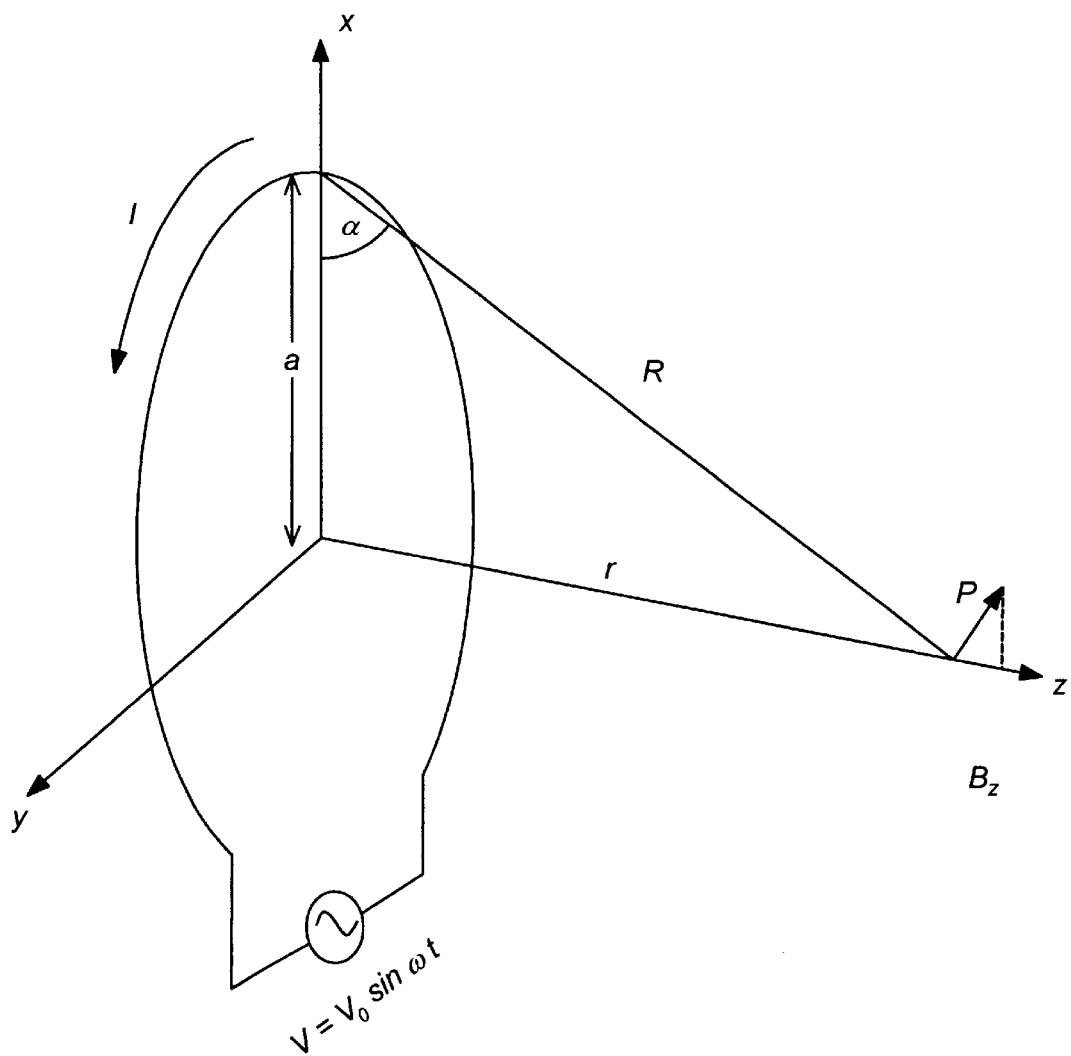

In another embodiment, the magnetic field H is generated by a current loop such as the loop illustrated in FIG. 1C. In this embodiment, the magnetic flux strength at location z is given by the following equation:

$$B_Z = \frac{\mu I N a^2}{2(a^2 + r^2)^{3/2}} \cong \frac{\mu I N a^2}{2}\left(\frac{1}{r^3}\right) \text{ for } r^2 >> a^2 \quad (6)$$

where I represents the current in the loop, a represents the radius of the loop, r represents the distance from the center of the loop to the location z, N represents the number of loop turns, and $\mu$ represents the permeability of the transmission media.

Therefore, for the case of a magnetic field created by a current I passing through N loops, the magnetic field strength at a location z a distance r from the center of the loop can be determined by combining equations (3) and (6) as follows:

$$H = \frac{I N a^2}{2r^3} \quad (7)$$

In this case, once the magnetic field strength has been determined, the distance between the base station 114 and the card 110 can be determined from the following relation:

$$r \propto \sqrt[3]{\frac{H_T(t_{thresh})}{H_{R_{thresh}}}} \quad (8)$$

where $H_T(t_{thresh})$ is the measured or estimated magnitude of the magnetic field at the base station at the time the magnetic field at the card 110 exceeds the threshold value (hereinafter $t_{thresh}$) and $H_{R_{thresh}}$ is the magnetic field threshold. Of course, using the foregoing teaching the distance between the base station 114 and the card 110 can be determined for other antenna designs as well, in which case, the relationship between the distance between the base station 114 and the card 110 can be described by a function of the ratio $$\frac{H_T(t_{thresh})}{H_{R_{thresh}}},$$

or $$f\left(\frac{H_T(t_{thresh})}{H_{R_{thresh}}}\right). \quad (9)$$

In one embodiment of the invention, the location of the card 110 is determined in a two-dimensional space by determining the distance r between a first base station (e.g. 114A) and the card 110 and a second base station (e.g. 114B) and the card 110. Using well-known geometrical and trigonometric relationships, the position of the card 110 in a plane formed by the card 110, the first base station 114A and the second base station 114B can be determined.

In another embodiment of the invention, the location of the card 110 is determined in a three-dimensional space by further determining the distance r between a third base station 114C and the card 110, and using this information to determine the card's 110 location. Alternatively, data from the third base station 114C (or, for that matter, additional base stations 114) can be used to increase the accuracy of the determination of the location of the card 110 (since, in many applications, the card 110, and the base stations 114 will all be effectively in the same plane).

To effect the multiple base station 114 embodiments described above, the time varying magnetic field H(t) from each of the base stations 114 can be time-multiplexed so that only one base station is transmitting at the same time. In another embodiment, a frequency, time, and/or phase relationship between the magnetic fields emanated by each of the base stations 114 can be used determine which of the base station's 114 magnetic field induced the card 100 to transmit the RF signal.

For example, the card 110 can be designed to emit a signal in accordance with two closely spaced threshold values instead of a single threshold. In this case, the card 110 transmits an RF signal identifying the card, and which threshold value was exceeded to the base station 114. If the frequency of the undulating magnetic fields from each base station 114 are sufficiently separated, the base station can use the timing of two received RF signals (which represent two threshold values) to determine whether the card 110 is responding to a magnetic signal generated by that particular base station 114, or from a different base station 114. Alternatively, the card 110 itself can identify the source of the magnetic field from the frequency of the phase relationships of the signals from the base stations 114, and transmit that information along with the RF signal. Finally, the foregoing techniques can be applied in conjunction with the time-multiplexing technique discussed in the previous paragraph, if desired.

In another embodiment of the present invention, the magnetic field emanating from each of the base stations 114 is not time-varying, but is relatively constant in intensity. In this embodiment, the card 110 measures the intensity of the magnetic field at the card's location, and reports the intensity (along with its identification) to the base station in the RF signal. This can be performed at pre-determined time intervals, or can be performed whenever the magnetic field from any of the base stations 114 changes sufficiently to indicate that the card 110 has been moved to a different location. This embodiment obviates the need for repetitive position information transmissions with essentially no information, and can save a significant amount of battery power in the card 110 electronics.

Figure 2:
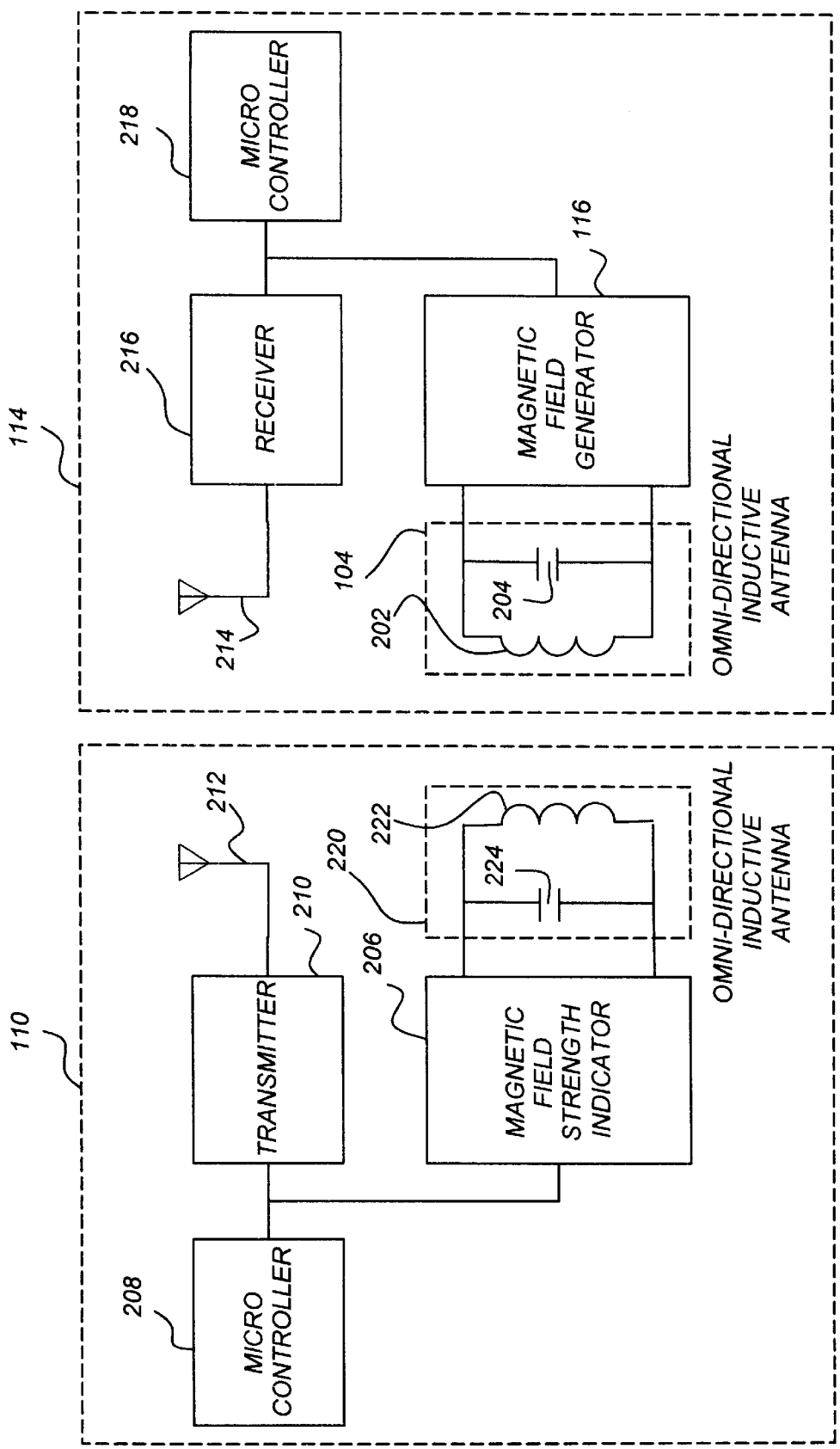
FIG. 2 is a block diagram illustrating one embodiment of the elements of the remote station or card and the base station.

FIG. 2 is a block diagram illustrating elements of the card 110 and the base station 114. The base station 114 comprises a magnetic field generator 116, coupled to the base station antenna 104.

The magnetic field generated by the magnetic field generator is sensed by the remote station or card 110 antenna 220, and provided to the magnetic field strength indicator 206. The magnetic field strength indicator 206 operates under control of a microcontroller 208 or other processor to measure the magnetic field strength at the location of the card 110. Using this measured magnetic field strength, the microcontroller 208 generates a signal that is indicative of the measured magnetic field strength. This signal is provided to the transmitter 210, which generates and transmits a signal using the coupled remote station antenna 212. The transmitted signal may include coded information to identify the card 110 and is preferably appropriately modulated for efficient transmission.

The signal transmitted by the card 110 is received, detected, and demodulated by an RF signal antenna 214 in the base station 114 by the receiver 216 operating under control of a processor such as the base station microcontroller 218.

In one embodiment, the magnetic field generator 116 produces a time-varying magnetic field. In one embodiment of the invention, the magnetic field can vary according to a frequency between about 10 and 100 Hz. This time-varying magnetic field is sensed by the remote station antenna 220 and magnetic field generator 206, and provided to the remote station microcontroller 208. The microcontroller then compares the measured magnetic field strength with a threshold value. When the measured strength exceeds the threshold value, the transmitter is directed to transmit an ID for the remote station 110 to the base station 114. Since the base station 114 knows or can estimate the magnetic field, the timing of the received signal from the remote station 110 indicates that the magnetic field strength threshold has been exceeded at the remote station, providing an indicator of its distance.

In another embodiment, the signal from the magnetic field strength is constant, and the elements of the remote station 110 periodically measure the signal strength, and transmit that information (along with the remote station ID) to the base station 114. The base station receiver 216 and antenna 214, receives this information and passes it to the base station microcontroller 218, where it is used to compute the distance between the base station 114 and the remote station 110.

The microcontrollers 218 of each base station 114 may be communicatively coupled (e.g. via hardwire, radio frequency, infrared, or network link) so that information between the base stations 114 can be shared, and/or to allow each of the base stations 114 to be individually controlled. This capability allows each base station 114 to be activated one at a time so that the location of the card 110 can be determined by vectoring or triangulation. This can be implemented by substituting a transceiver (capable of both reception and transmission of an information signal) for the base station receiver 216. If desired, a remote station transceiver may be substituted for the remote station transmitter 210.

In one embodiment, the base station antenna 104 is an omnidirectional inductive antenna with lumped parameters representable by a parallel-coupled inductive element 202 and capacitive element 204. The antenna 104 lumped parameters can be tuned to the 32.768 KHz transmission frequency of the magnetic field generator. The magnetic field strength indicator 206 and remote station antenna 220 are tuned via inductive element 222 and capacitive element 224 to efficiently receive the 32.768 KHz magnetic field.

In yet another embodiment of the present invention, the base station receiver 216 and/or the remote station transmitter 210 are transceivers (devices capable of both reception and transmission of a signal). This embodiment permits communication between the remote stations 110 and the base stations 114, and/or communication among the remote stations 110 and the base stations 114.

Figure 3:
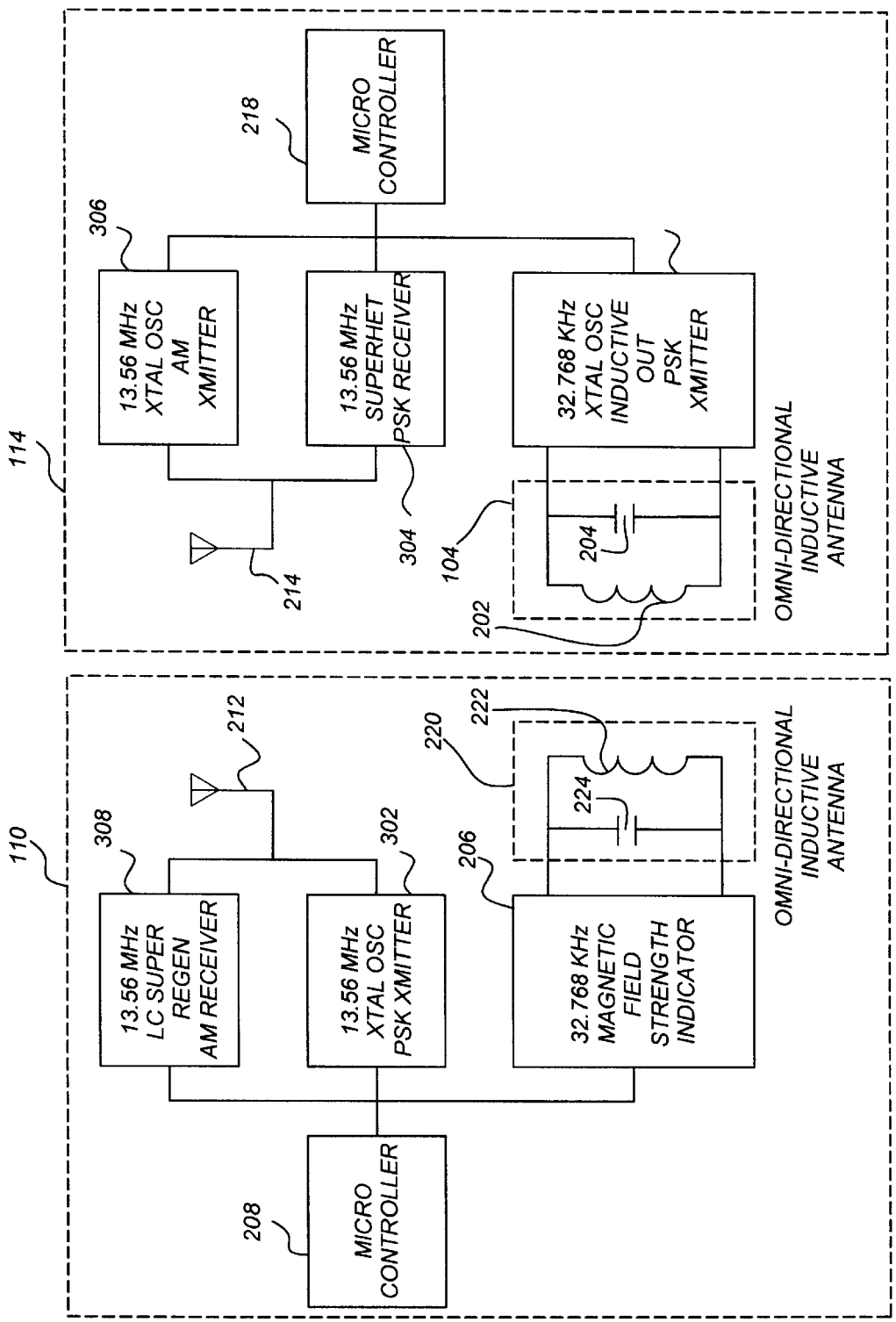
FIG. 3 is a block diagram of an alternative embodiment of the invention illustrating the use of separate transmitting and receiving units in the remote station and/or the base station.

FIG. 3 is a block diagram of another embodiment of the present invention, illustrating the use of separate transmitter and receiving units in the remote station or card 110 and the base station 114. Here, the RF signal is transmitted from the card 110 by a 13.56 MHz crystal oscillator controlled transmitter 302 using phase-shift keying modulation techniques. This signal is detected, demodulated, and provided to the base unit microcontroller 218 for processing by a superheterodyne phase shift keyed (PSK) receiver tuned to 13.56 MHz. This implementation provides better signal-to-noise (S/N) ratio, and reduces interference. Further, it takes advantage of currently available lightweight, low cost, and low power consumption PSK transmitter technologies.

If RF transmission from the base station 114 to the card 110 is desired, this is accomplished by amplitude modulated transmissions from the base station 114 to the card 110. This is implemented by a 13.56 MHz AM transmitter in the base station, which transmits an RF signal to the remote station 110 or other base stations 114 under control of the base station microcontroller 218. To receive this signal, the card 110 includes a 13.56 MHz inductive-capacitive (LC) regenerative AM receiver. Since AM detectors are simple and easy to implement, this simplifies the design and construction of the card 110.

Figure 4:
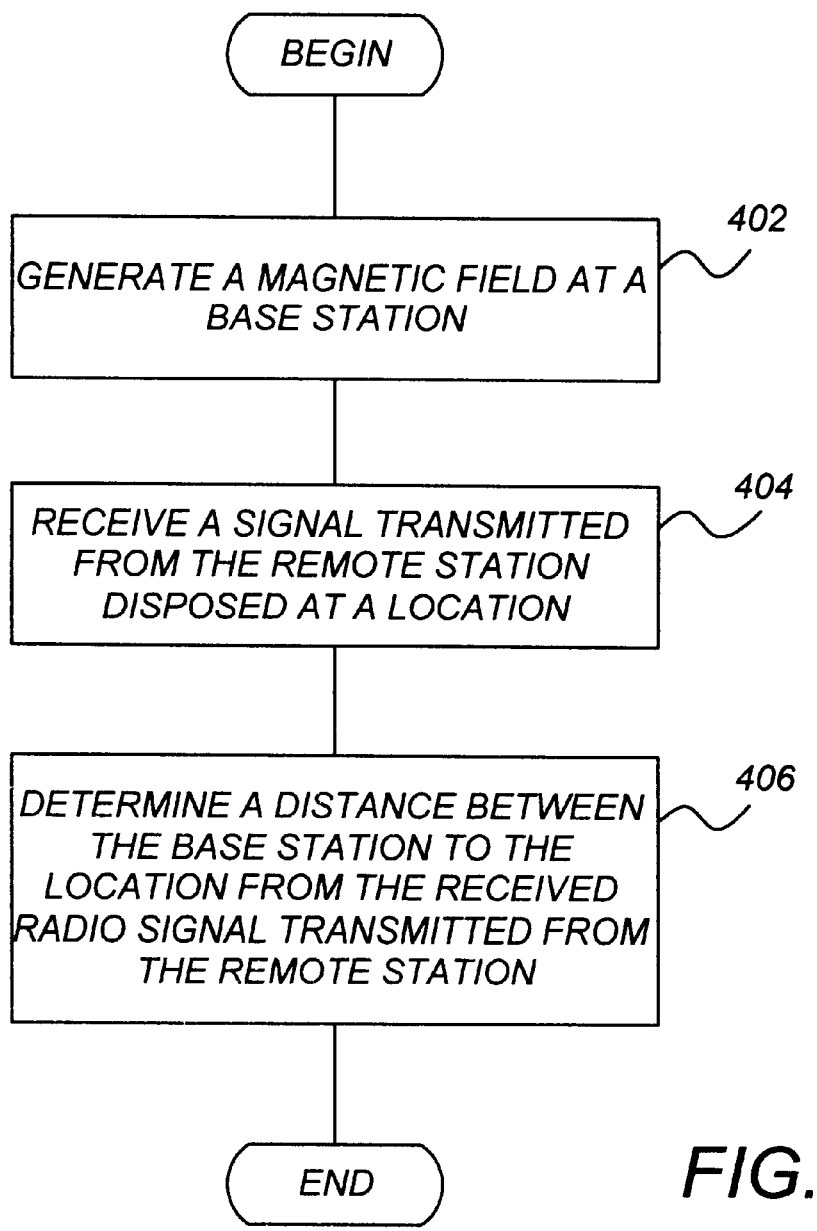
FIG. 4 is a flow chart presenting exemplary method steps used to practice one embodiment of the invention from the perspective of the base station.

FIG. 4 is a flow chart presenting exemplary method steps used to practice one embodiment of the present invention from the perspective of the base station 114. First, a magnetic field is generated at the base station 114, as shown in block 402. This magnetic field is sensed by the remote station or card 110, and used to generate a radio signal. The radio signal is received by the base station 114 and used to determine the distance between the base station to the card 110 location. This is illustrated in blocks 404 and 406.

In one embodiment of the present invention, the magnetic field is time varying according to the relationship $H_T(t)$, and the radio signal is transmitted from the remote station 110 when an intensity of the time-varying magnetic field $H_T(t)$ exceeds a threshold value. The distance from the base station 114 to the remote station 110 is then determined as proportional to a function $$f\left(\frac{H_T(t_{thresh})}{H_{R_{thresh}}}\right),$$

wherein $H_T(t_{thresh})$ is a magnitude of the magnetic field at the base station at $t_{thresh}$ and $H_{R_{thresh}}$ is the magnetic field threshold.

In another embodiment of the present invention, the magnetic field is substantially time-invariant in amplitude. Here, the remote station 110 senses and measures the magnetic field emanated from the base station 114 and transmits information indicating the measured strength to the base station 114. In this case, the distance from the base station 114 to the location of the remote station is determined as proportional to a function $$f\left(\frac{H_T}{H_R}\right),$$

wherein $H_T$ is magnitude of the magnetic field at the base station (measured or estimated) and $H_R$ is the measured strength of the magnetic field at the remote station 110. The radio signal can be transmitted from the remote station 110 to the base station 114 at predetermined intervals, by command from the base station 114 or other entity, or when the field strength measured by the remote station 110 changes a specified amount (indicating that the location of the remote station has changed).

Figure 5:
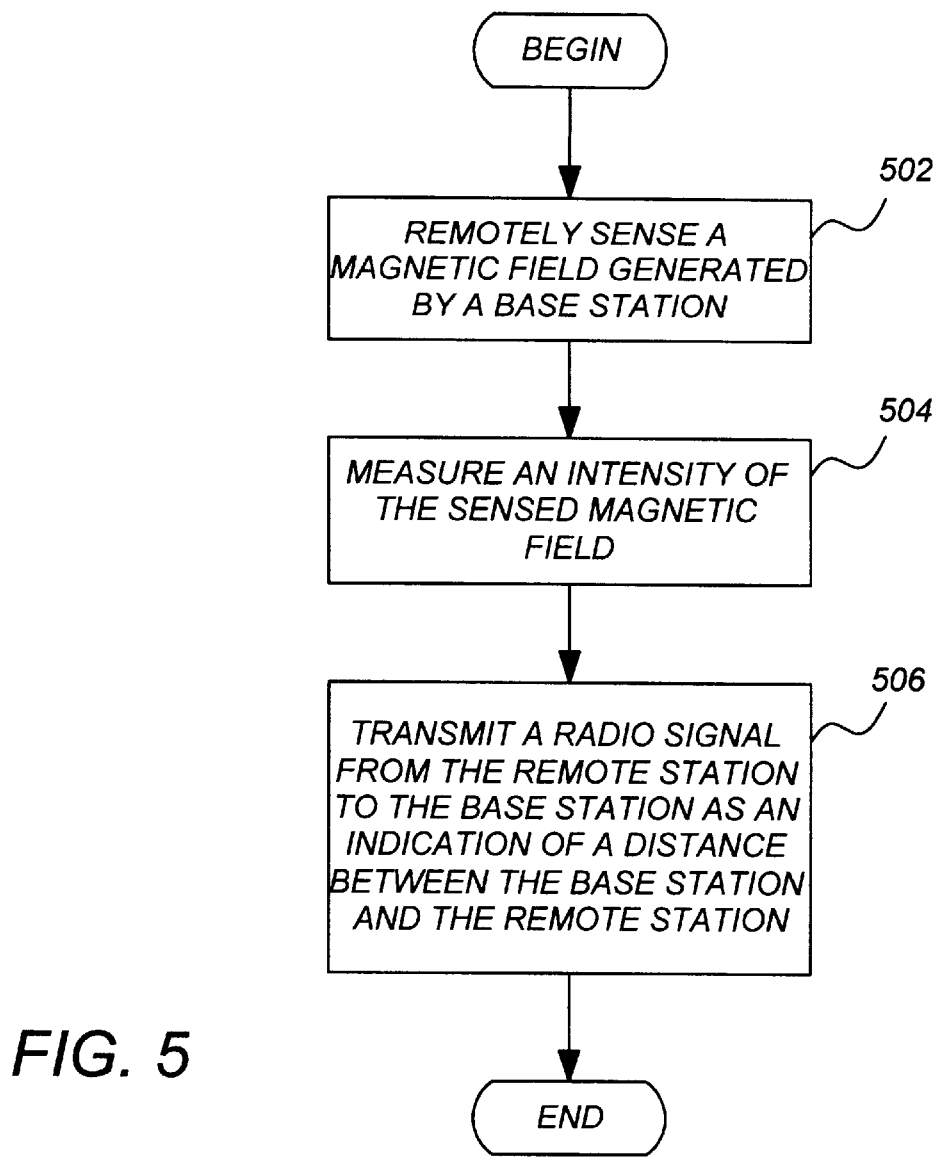
FIG. 5 is a flow chart presenting exemplary method steps used to practice one embodiment of the invention from the perspective of the remote station.

FIG. 5 is a flow chart presenting exemplary method steps used to practice one embodiment of the present invention from the perspective of the remote station 110. A magnetic field generated by the base station 114 is remotely sensed by the remote station 110, as shown in block 502. The intensity of the sensed magnetic field is measured, and a radio signal derived from this measurement is transmitted from the remote station 110 to the base station 114 as an indication of the distance between the base station 114 and the remote station 506. Triangulation, using well-known geometric and trigonometric principles, can be used to determine the location of the remote station 110 in either two-dimensional or three-dimensional space.

Conclusion

This concludes the description of the preferred embodiments of the present invention. In summary, the present invention describes a method and apparatus for tracking assets.

The method comprises the steps of generating a magnetic field at the base station, receiving a radio signal transmitted from the remote station disposed at a location, and determining a distance from the base station to the location from the received radio signal transmitted from the remote station. In another embodiment of the invention, the method comprises the steps of remotely sensing a magnetic field generated by a base station, measuring an intensity of the sensed magnetic field, and transmitting a radio signal from the remote station to the base station as an indication of a distance between the base station and the remote station.

The apparatus comprises tracking system having a magnetic field generator, a receiver for receiving a signal from a remote station indicative of a distance between the base station and the remote station, and a processor, coupled to the magnetic field generator and the receiver, the processor for determining a distance from the remote location to the base station from the received signal. In one embodiment, the processor is embodied in discrete components, which generate a signal proportional to the distance between the remote location and the base station. In another embodiment, the processor includes a digital processing unit communicatively coupled to a memory having instructions for computing the distance between the remote location and the base station from the received signal.

The foregoing description of the preferred embodiment of the invention has been presented for the purposes of illustration and description. It is not intended to be exhaustive or to limit the invention to the precise form disclosed. Many modifications and variations are possible in light of the above teaching. For example, using the teaching described above, the remote stations 110 or cards may perform multiple measurements of the magnetic field produced by the base station 114 and use these multiple samples to generate a more accurate determination of the magnetic field strength. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of locating a remote station, comprising the steps of:

generating a magnetic field at a base station;
receiving a radio signal transmitted from the remote station disposed at a location in response to the magnetic field; and
determining the distance from the base station to the location from the received radio signal transmitted from the remote station; wherein
the magnetic field is time varying according to $H_T(t)$;
the radio signal is transmitted from the remote station when an intensity of the time-varying magnetic field measured at the remote station exceeds a threshold; and
the step of determining the distance from the base station to the location from the received radio signal comprises the step of determining the distance from the base station to the location from the time the radio signal is received at the base station.

2. The method of claim 1, wherein the time varying magnetic field exceeds the magnetic field threshold at time $t_{thresh}$, and the step of determining the distance from the base station to the location from the time the radio signal is received at the base station comprises the step of:

determining the distance from the base station to the location of the remote station as proportional to a function $$f\left(\frac{H_T(t_{thresh})}{H_{R_{thresh}}}\right),$$

wherein $H_T(t_{thresh})$ is a magnitude of the magnetic field at the base station at $t_{thresh}$ and $H_{R_{thresh}}$ is the magnetic field threshold.

3. The method of claim 1, further comprising the steps of:
generating a second magnetic field at a second base station;
receiving a second radio signal transmitted from the remote station at the location;
determining the distance from the second base station to the remote station from the received second radio signal transmitted from the remote station; and
determining the planar location of the remote station from the distance from the first base station to the remote station and the distance from the second base station to the remote location.

4. The method of claim 1, further comprising the steps of:
generating a third magnetic field at a third base station;
receiving a third radio signal transmitted from the remote station at the location;
determining the distance from the third base station to the remote station from the received third radio signal transmitted from the remote station; and
determining the location of the remote station from the distance from the first base station to the remote station, the distance from the second base station to the remote location, and the distance from the third base station to the remote station.

5. The method of claim 3, wherein:
the magnetic field is time varying according to a first frequency;
the second magnetic field is time-varying according to a second frequency; and
the step of determining the planar location of the remote station from the distance from the first base station to the remote station and the distance between the second base station to the remote station comprises the steps of:
using a timing of first radio signal and the second radio signal to determine whether the remote station responded to the first magnetic field or the second magnetic field.

6. The method of claim 3, wherein:
the magnetic field is time varying according to a first frequency;
the second magnetic field is time-varying according to a second frequency; and
the step of determining the planar location of the remote station from the distance from the first base station to the remote station and the distance between the second base station to the remote station comprises the steps of:
identifying, in the remote station, the base station as a source of the first magnetic field from a frequency of a phase relationships of the first radio signal and the second radio signal; and
transmitting the identification of the base station as the source of the first magnetic field to the first base station.

7. An apparatus for locating a remote station, comprising:
a magnetic field generator;
a receiver for receiving a signal from a remote station indicative of a distance between the base station and the remote station; and
a processor, coupled to the magnetic field generator and the receiver, the processor communicatively coupled to a memory having instructions for commanding the processor to compute the distance from the remote location to the base station from the received signal; wherein
the magnetic field generator generates a time-varying magnetic field according to $H_T(t)$; and
the signal is transmitted from the remote station when an intensity of the time-varying magnetic field measured at the remote station exceeds a threshold; and
wherein the instructions comprise a module for determining the distance from the base station to the location of the remote station as proportional to a function $$f\left(\frac{H_T(t_{thresh})}{H_{R_{thresh}}}\right),$$

wherein $H_T(t_{thresh})$ is a magnitude of the magnetic field at the base station at $t_{thresh}$ and $H_{R_{thresh}}$ is the magnetic field threshold.

8. An apparatus for locating a remote station, comprising:
means for generating a magnetic field at a base station;
means for receiving a radio signal transmitted from the remote station disposed at a location in response to the magnetic field;

means for determining the distance from the base station to the location from the received radio signal transmitted from the remote station; wherein the magnetic field is time varying according to $H_T(t)$;

the radio signal is transmitted from the remote station when an intensity of the time-varying magnetic field measured at the remote station exceeds a threshold; and the means for determining the distance from the base station to the location from the received radio signal comprises means for determining the distance from the base station to the location from the time the radio signal is received at the base station.

9. The apparatus of claim 8, wherein the time varying magnetic field exceeds the magnetic field threshold at time $t_{thresh}$, and the means for determining the distance from the base station to the location from the time the radio signal is received at the base station comprises:

means for determining the distance from the base station to the location of the remote station as proportional to a function $$f\left(\frac{H_T(t_{thresh})}{H_{R_{thresh}}}\right),$$

wherein $H_T(t_{thresh})$ is a magnitude of the magnetic field at the base station at $t_{thresh}$ and $H_{R_{thresh}}$ is the magnetic field threshold.

10. The apparatus of claim 8, further comprising:

means for generating a second magnetic field at a second base station;

means for receiving a second radio signal transmitted from the remote station at the location;

means for determining the distance from the second base station to the remote station from the received second radio signal transmitted from the remote station; and means for determining the planar location of the remote station from the distance from the first base station to the remote station and the distance from the second base station to the remote location.

11. The apparatus of claim 8, further comprising:

means for generating a third magnetic field at a third base station;

means for receiving a third radio signal transmitted from the remote station at the location;

means for determining the distance from the third base station to the remote station from the received third radio signal transmitted from the remote station; and means for determining the location of the remote station from the distance from the first base station to the remote station, the distance from the second base station to the remote location, and the distance from the third base station to the remote station.

* * * * *